(12) United States Patent
Ascencio Rios et al.

(10) Patent No.: US 10,839,373 B2
(45) Date of Patent: Nov. 17, 2020

(54) VIRTUAL PAYMENT ACCOUNT AND TRANSACTION METHOD

(71) Applicant: INTERNATIONAL BUSINESS MACHINES CORPORATION, Armonk, NY (US)

(72) Inventors: Sergio E. Ascencio Rios, Zapopan (MX); Natalie N. Brooks Powell, Bolingbrook, IL (US); Yuk L. Chan, Rochester, NY (US); Apurv R. Johar, Dublin, CA (US); Heidi Lagares-Greenblatt, Jefferson Hills, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 668 days.

(21) Appl. No.: 15/286,064

(22) Filed: Oct. 5, 2016

(65) Prior Publication Data
US 2018/0096344 A1 Apr. 5, 2018

(51) Int. Cl.
*G06Q 40/00* (2012.01)
*G06Q 20/34* (2012.01)
*G06Q 20/10* (2012.01)

(52) U.S. Cl.
CPC ......... *G06Q 20/3572* (2013.01); *G06Q 20/10* (2013.01); *G06Q 20/352* (2013.01)

(58) Field of Classification Search
CPC . G06Q 20/3224; G06Q 30/327; G06Q 20/405
See application file for complete search history.

(56) References Cited

U.S. PATENT DOCUMENTS

| 6,542,872 B1 | 4/2003 | Skubic et al. |
| 7,006,983 B1 * | 2/2006 | Packes, Jr. ............. G06Q 30/02 |
| | | 705/14.34 |

(Continued)

FOREIGN PATENT DOCUMENTS

| CA | 2915375 | * | 6/2016 | ............. G06Q 20/24 |
| WO | WO-2004042626 A2 * | 5/2004 | ............. G06Q 30/04 |

OTHER PUBLICATIONS

Garner et al., "Card-based Macropayment for Mobile Phones," Proceedings of the International Conference on Mobile Business, IEEE, (Year: 2006).*

(Continued)

*Primary Examiner* — Alexander G Kalinowski
*Assistant Examiner* — William B. Bunker
(74) *Attorney, Agent, or Firm* — Cantor Colburn LLP; Teddi Maranzano (57) ABSTRACT

A computer-implemented method for an electronic funds transfer, the method including obtaining a virtual payment account having access to a plurality of electronic payment mediums capable of being utilized in an electronic funds transfer. Obtaining, using an electronic payment management system, information related to the electronic fund and determining by the electronic payment management system based on the information related to the electronic fund a selected electronic payment medium from the plurality of electronic payment mediums for being the source of electronic funds for the electronic funds transfer. Based on the selection, recommending the selected electronic payment medium to a user for presentation to an electronic terminal for engaging in the electronic funds transfer.

19 Claims, 7 Drawing Sheets

(56) References Cited

U.S. PATENT DOCUMENTS

| | | | |
|---|---|---|---|
| 8,799,089 B1 | 8/2014 | Gonzalez Loyo | |
| 9,373,197 B2* | 6/2016 | Dutta | G07F 17/246 |
| 2010/0185505 A1* | 7/2010 | Sprogoe | G06Q 30/0235 |
| | | | 705/14.27 |
| 2011/0153437 A1* | 6/2011 | Archer | G06Q 20/3278 |
| | | | 705/17 |
| 2012/0084132 A1* | 4/2012 | Khan | G06Q 20/3278 |
| | | | 705/14.26 |
| 2012/0271692 A1* | 10/2012 | Huang | G06Q 30/06 |
| | | | 705/14.23 |
| 2013/0073404 A1 | 3/2013 | Narendra et al. | |
| 2013/0181045 A1* | 7/2013 | Dessert | G06Q 30/0601 |
| | | | 235/383 |
| 2013/0268438 A1 | 10/2013 | Boyle | |
| 2013/0339165 A1* | 12/2013 | Calman | G06Q 30/06 |
| | | | 705/16 |
| 2014/0067514 A1* | 3/2014 | Vitti | G06Q 30/0236 |
| | | | 705/14.36 |
| 2014/0100973 A1 | 4/2014 | Brown et al. | |
| 2014/0278905 A1* | 9/2014 | DeNardis | G06Q 20/387 |
| | | | 705/14.38 |
| 2015/0006270 A1* | 1/2015 | Xu | G06Q 30/0222 |
| | | | 705/14.23 |
| 2015/0012425 A1* | 1/2015 | Mathew | G06Q 20/227 |
| | | | 705/41 |
| 2015/0142657 A1 | 5/2015 | Sagastiverza et al. | |
| 2015/0199657 A1 | 7/2015 | Castinado et al. | |
| 2015/0242839 A1* | 8/2015 | Sanchez | G06Q 20/40 |
| | | | 705/38 |
| 2015/0248665 A1* | 9/2015 | Walz | G06Q 30/0257 |
| | | | 705/14.27 |
| 2015/0262291 A1 | 9/2015 | West et al. | |
| 2015/0286995 A1 | 10/2015 | Korosec | |
| 2016/0110707 A1 | 4/2016 | Nack et al. | |
| 2017/0076265 A1* | 3/2017 | Royyuru | G06Q 20/18 |
| 2017/0161728 A1* | 6/2017 | Satyanarayan | G06Q 30/0238 |
| 2018/0096337 A1 | 4/2018 | Ascencio Rios et al. | |
| 2018/0096343 A1 | 4/2018 | Ascencio Rios et al. | |
| 2018/0096344 A1 | 4/2018 | Ascencio Rios et al. | |

OTHER PUBLICATIONS

N.A., "Press Releases: MasterCard Introduces MasterPass—The Future of Digital Payments", Business Wire, 2013, pp. 1-4.

List of IBM Patents or Patent Applications Treated as Related; (Appendix P), Filed ___; 2 pages.

Ascencio Rios et al.,"Virtual Payment Account", U.S. Appl. No. 15/282,063, filed Oct. 5, 2016.

Sergio E. Ascencio Rios et al., "Virtual Payment Account", U.S. Appl. No. 15/286,052, filed Oct. 5, 2016.

\* cited by examiner

| Account | Transaction | Amount |
|---|---|---|
| Credit Card 1 | Groceries | $256.82 |
| Credit Card 2 | Gas | $56.72 |
| Bank Account | Clothes | $356.22 |

VIRTUAL PAYMENT ACCOUNT AND TRANSACTION METHOD

BACKGROUND

Many commercial transactions utilize an electronic funds transfer of money from one account directly to another without paper money being utilized. Consumers may possess multiple mediums for engaging in an electronic funds transfer. For instance, the use of a credit or debit card as a medium for utilizing an electronic terminal to complete a purchase is one of the most common instances of an electronic funds transfer. As many consumers utilize multiple credit or debit cards, a method for assisting a consumer in deciding which credit or debit card to utilize would be helpful in aiding in their management of the respective payment mediums.

SUMMARY

In accordance with one or more embodiments, a computer-implemented method for an electronic funds transfer, the method including obtaining a virtual payment account having access to a plurality of electronic payment mediums capable of being utilized in an electronic funds transfer. Obtaining, using an electronic payment management system, information related to the electronic funds transfer and determining by the electronic payment management system based on the information related to the electronic funds transfer a selected electronic payment medium from the plurality of electronic payment mediums for being the source of electronic funds for the electronic funds transfer. The selection of the electronic payment medium, based on the determination, is recommended to a user for presentation to an electronic terminal for engaging in the electronic funds transfer.

In accordance with one or more embodiments, a system for an electronic funds transfer involving the purchase of items or services. The system includes an input device associated with a user device for inputting information relating to the items or services associated with the electronic funds transfer. An electronic payment management system having a processor system accesses a virtual payment account including a plurality of electronic payment mediums issued by a plurality of distinctive issuers. The processor system receives the information relating to the items or services associated with the electronic funds transfer and are capable of accessing incentive information from remote sites associated with the distinctive issuers of the respective electronic payment mediums related to the items associated with the electronic funds transfer. The processor system providing a recommendation to a user device on the selection of a respective electronic payment medium from the plurality of electronic payment mediums associated with the virtual payment account based on the information relating to the item or services associated with the electronic funds transfer and incentive information associated with the distinctive issuers of the respective electronic payment mediums related to the items associated with the electronic funds transfer.

In accordance with one or more embodiments, a computer program product for an electronic funds transfer is provided wherein the computer program product includes a computer readable storage medium having program instructions embodied therewith, wherein the computer readable storage medium is not a transitory signal per se, the program instructions being readable by a processing circuit to cause the processing circuit to perform a method which includes obtaining a virtual payment account having access to a plurality of electronic payment mediums capable of being utilized in an electronic funds transfer. Obtaining, using an electronic payment management system, information related to the electronic fund transfer and determining by the electronic payment management system based on the information related to the electronic funds transfer a selected electronic payment medium from the plurality of electronic payment mediums for being the source of electronic funds for the electronic funds transfer. The selection of the electronic payment medium, based on the determination, is recommended to a user for presentation to an electronic terminal for engaging in the electronic funds transfer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and method for conducting an electronic funds transfer utilizing a virtual payment account. Electronic funds transfer occur when a consumer purchases an item utilizing an electronic payment medium which initiates the transfer of funds from the bank account of the consumer to a bank account of a merchant or lender of credit. Such common transactions include the use of credit and debit cards as well as non-contact and near field communication devices which interact with electronic terminals for completing the electronic. A virtual payment account interacts with a management system for managing the various electronic payment mediums available to the consumer for assisting in maximizing the benefit of the transaction for the consumer. When a consumer transaction is initiated, the management system assesses multiple variables including extrinsic information relating to the transaction to determine if such information would influence the consumer in the selection of an appropriate electronic payment medium. The extrinsic information is evaluated and an electronic payment medium is suggested to the consumer for completing the electronic funds transfer.

Figure 1:
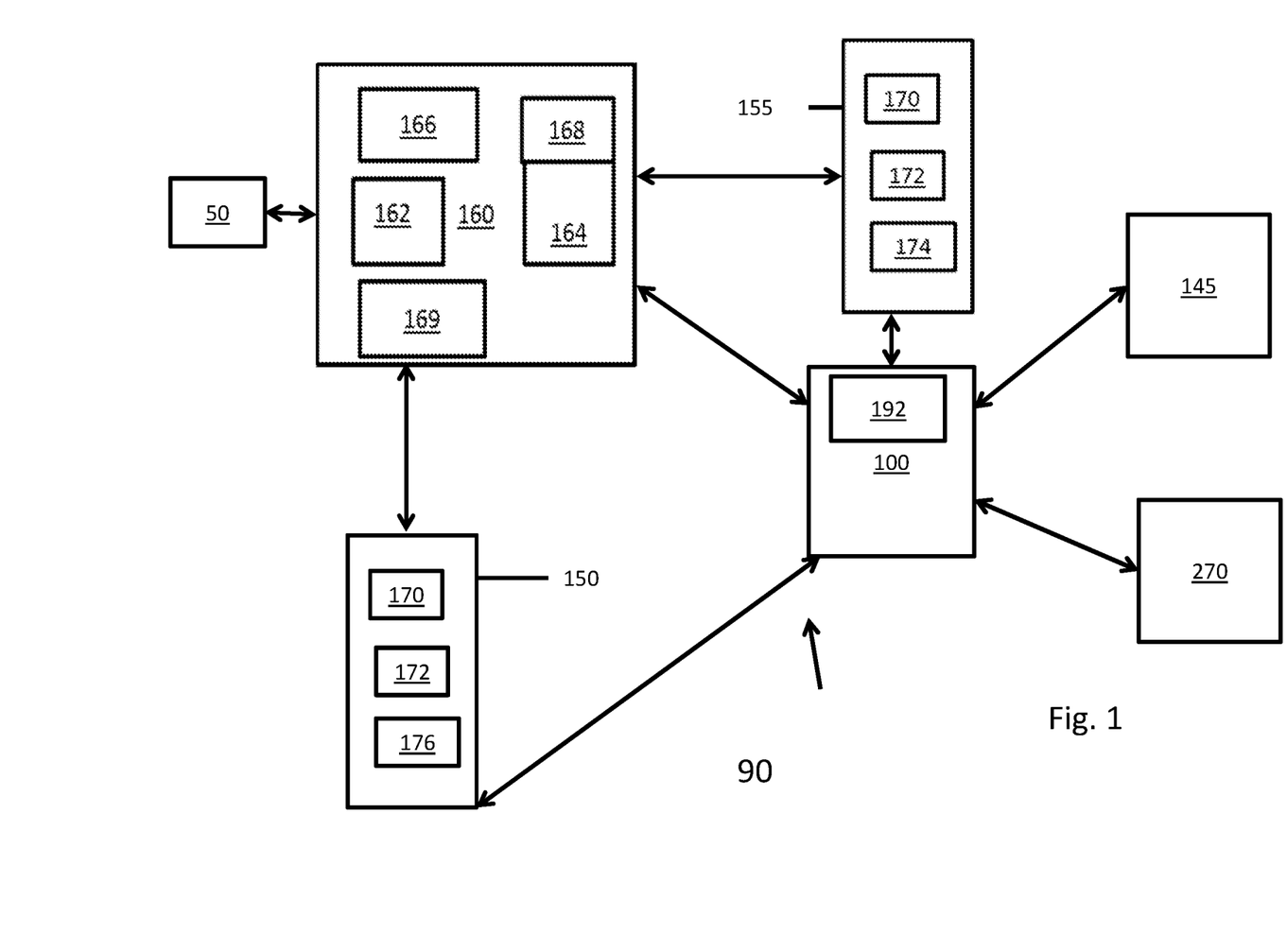
FIG. 1 illustrates a general overview of a system for conducting an electronic funds transfer utilizing a virtual payment system according to one or more embodiments.

Turning now to a more detailed description of the present disclosure, there is shown in FIG. 1, a system for conducting an electronic funds transfer utilizing the electronic funds transfer system. The system includes a user device 160 capable of engaging in the electronic funds transfer utilizing the electronic funds system. User device 160 may be any type of computing device capable of communicating electronically with a merchant capable of receiving electronic information necessary for conducting an electronic funds transfer. User device 160 may include a desktop computer, a laptop mobile computer, a personal data assistant, or a smartphone. User device 160 includes a user device memory 164 and a user device processor 162 for controlling the operation of user device 160. In an embodiment, user device 160 is a mobile device such as a smartphone and the respective memories and processors run an application for initiating the utilization of a virtual payment account for engaging in the electronic funds transfer. User device 160 includes a global positioning system (GPS) 166. An electronic communication system 168 enables user device 160 to communicate with external devices such as electronic payment management system 100 and merchant electronic terminal 50 via communications network 90. User device 160 may include a microphone 169 for recording audio voice commands for initiating the virtual payment.

Virtual payment account 150 includes a plurality of electronic payment mediums 170, 172 and 176. Electronic payment medium 170 may be a merchant-issued card such as a Macy's®, Sears® or Amazon® card which may provide special incentives and rewards for utilizing the respective card at the merchants. For instance, when shopping at the respective merchant, utilizing their card for completing the commercial transaction may result in ten percent of the sales price being discounted to the consumer. Electronic payment medium 172 may be a bank institution issued card such as a Chase® select card or a debit account associated with a checking account located at the banking institution which may provide special incentives and rewards for utilizing the card for certain transactions. For instance, the select card may provide five percent cash back on purchases for consumer items such as gasoline, groceries, or clothes. Electronic payment medium 176 may be a credit card processing system issued card such as Visa®, American Express®, MasterCard®, or Discovery® which provide special incentives and promotions. For instance, a select card may provide a cash back rewards program, may donate money to a special cause, or may offer special interest programs depending on the consumer items purchased with the respective electronic payment medium. Electronic payment medium 176 maybe a digital payment system such as Apply Pay®.

As shown in FIG. 1, virtual payment account 150 includes electronic payment medium 170, 172 and 176. Additional virtual payment accounts 155 includes electronic payment medium 170 and 172 as well but substitute's electronic payment medium 174 which may be a gift card. Virtual payment accounts 150 and 155 may utilize the same electronic payment mediums but have different rules associated with the utilization of the electronic payment mediums depending on the user associated with the virtual payment account.

Electronic payment management system 100 manages the selection of the respective electronic payment medium associated with a virtual payment account and recommends an electronic payment medium for utilization in the electronic funds transfer. Electronic payment management system 100 includes a rules database 192 containing rules which are evaluated based on the virtual payment account, the user, and the parameters of the electronic funds transfer.

Electronic payment management system 100 may be connected by network 90 with remote site 145. Remote site 145 may be a WAN or other network system associated with a merchant. For instance, if shopping at a particular merchant location such as a Macy's® facility, the facility may include a specialized messaging system transmitting information related to incentives for making a purchase such as special sales for the day or other purchasing incentive information including discounts for purchases utilizing a Macy's® electronic payment medium. Remote site 145 may be a website hosted by an electronic payment medium issuer. For instance, for virtual payment account 150, electronic payment medium 176 may be issued by American Express® and remote site 145 is hosted by American Express®. When the virtual payment account is initiated, electronic payment management system may communicate with remote site 145 hosted by American Express® to inquire on special deals or rewards which American Express® may provide in relation to the electronic funds transfer. Remote site 145 may also be a third party website offering coupons or the like for the items which are the subject matter of the electronic funds transfer. Remote site 145 may be a website hosted by the manufacture of the items which are the subject matter of the electronic funds transfer which may provide incentives for purchasing the respective item such as a cash back rebate, two for one offer, or extended warranty. Electronic payment management system 100 may provide a report 270. Report 270 may provide transactional related information for the virtual payment accounts.

Figure 2:
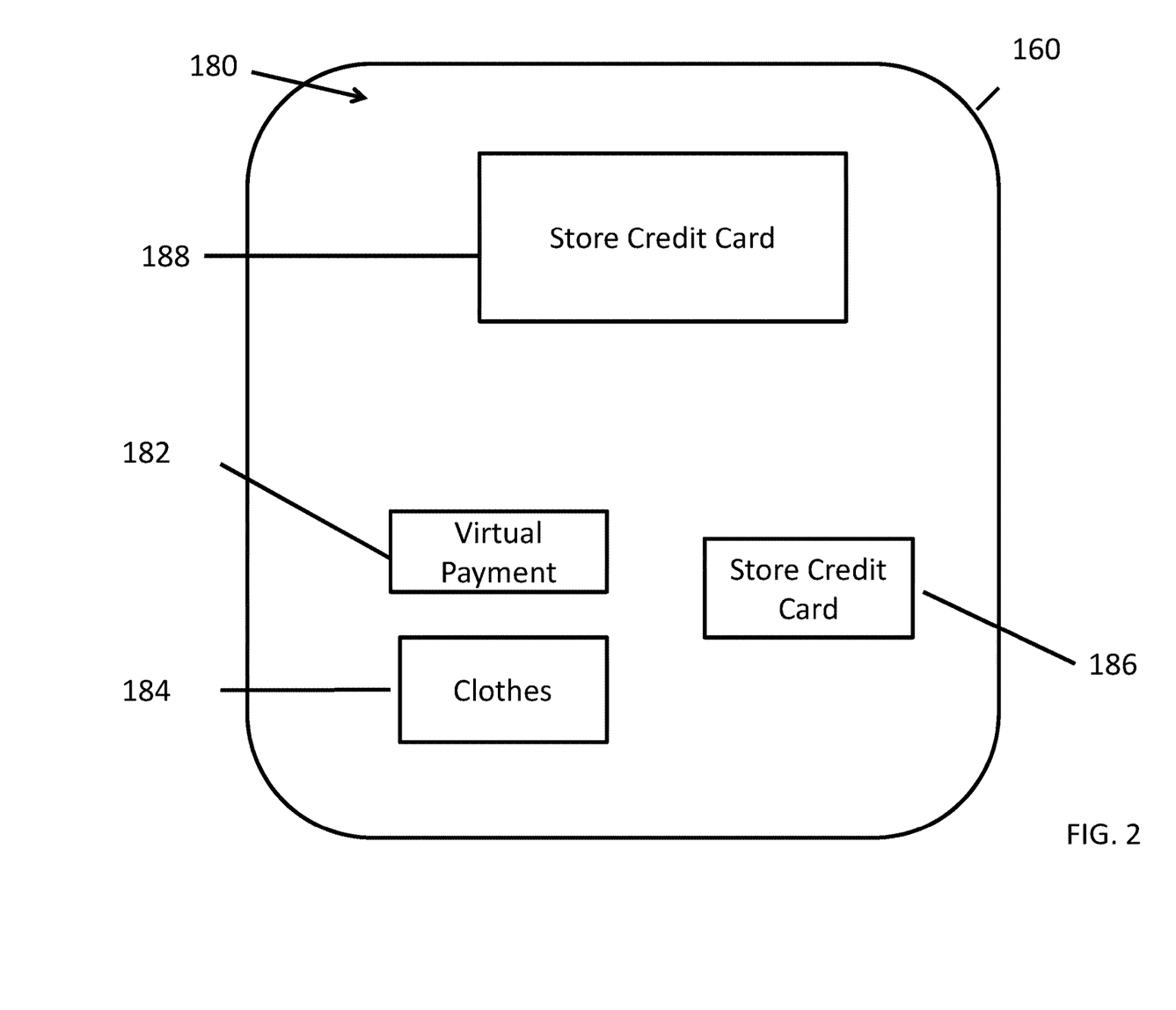
FIG. 2 illustrates a device for conducting an electronic funds transfer utilizing a virtual payment system according to one or more embodiments.

As shown in FIG. 2, device 160 includes a display 180 for displaying information to the user. Display 180 may include a virtual payment input key 182 for initiating the respective application to initiate instructions relating to utilizing a virtual payment account for an electronic funds transfer. Device 160 may include an input are for inputting information related to the transaction including the price of items which are the subject to the electronic funds transfer, identity of the items, the manufacturer of the items' identity of the merchant, and other information specific to the electronic funds transfer. Device 160 may display the recommendation of the electronic payment medium 186. Device 160 also provides electronic payment medium signature 188 relating to the recommended electronic payment medium for engaging in an electronic funds transfer. Electronic payment medium signature 188 interacts with merchant electronic terminal 50. Electronic payment medium may interact with merchant electronic terminal 50 via near field communication technology, or contactless technology utilizing a RFID device, a QR code, a barcode, Bluetooth, or other technology wherein the information is electronically communicated without physical contact.

Figure 3:
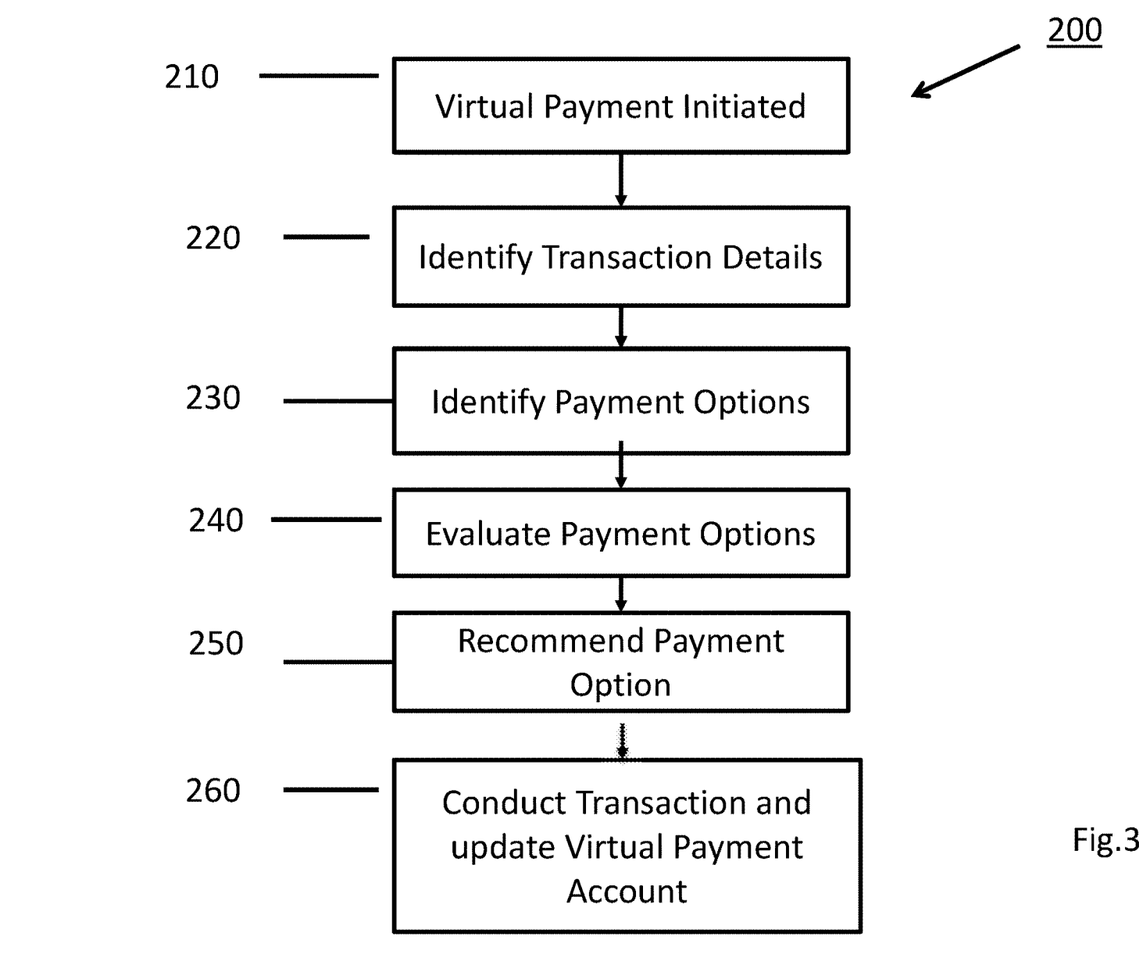
FIG. 3 illustrates a flow chart of a system for conducting an electronic funds transfer utilizing a virtual payment system according to one or more embodiments.

According to one embodiment, as shown in FIG. 3, a user may utilize device 160 for an electronic funds transfer utilizing a virtual payment mode 200. A user activates the device for the virtual payment mode at block 210 for a respective virtual payment account and utilizes the respective application. In the virtual payment mode, the device, such as the smartphone, communicates with the electronic payment management system for selecting the appropriate electronic payment medium for utilization in the transaction. At block 220, the user identifies the transaction details utilizing the input mechanisms of device 160. The transaction details are provided to the electronic payment management system for utilization in determining the appropriate electronic purchase medium to select. At block 230, the electronic payment management system identifies which electronic payment mediums are associated with the virtual payment account identified and accesses extrinsic information relating to the respective electronic payment mediums and additional remote sites based on the transaction details provided by the user. At block 240, based on the extrinsic information received at block 230 and additional information related to the transaction and the user, the respective options for payment utilizing the electronic payment mediums associated with the respective virtual payment account are evaluated. Based upon the evaluation at block 240, a payment option utilizing an electronic payment medium is recommended at block 250. Based upon the recommendation, the user may utilize the recommendation or chose another electronic payment medium for conducting the electronic fund at block 260. Once the electronic funds transfer has been completed, at block 260, the records associated with the virtual payment account identifying the parameters of the transaction such as location, merchant, price, items purchased, time and date, and user are recorded.

Figure 4:
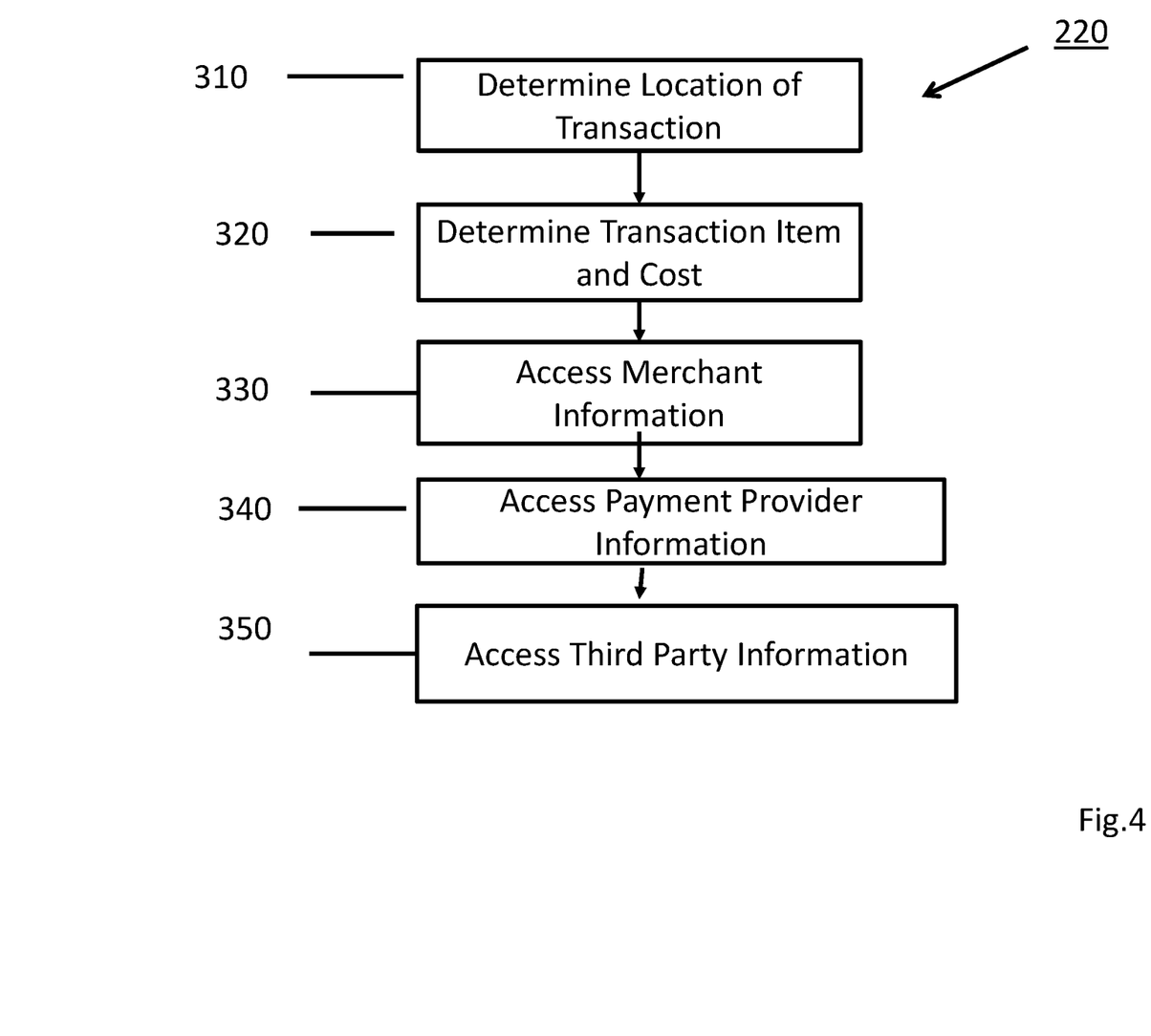
FIG. 4 illustrates a flow chart for obtaining information related to an electronic funds transfer for utilization in a virtual payment system according to one or more embodiments.

FIG. 4 illustrates steps associated with block 220 identify transaction details. The transaction details are utilized by the electronic payment management system for evaluating the benefits associated with utilizing a respective electronic payment medium for the particular electronic funds transfer being undertaken. At block 310 the location of the transaction is identified. This may be provided by the GPS system using iBeacon technology that retrieves location information from an iBeacon enabled hardware, determined by a specific protocol between the virtual payment account and the merchant electronic terminal or the user may input the general name of the merchant. This information may be utilized in comparing with a rule preventing the purchase of an item from an unauthorized merchant. Additionally, if the name of the merchant is provided, the electronic payment medium management may automatically add a particular electronic payment medium associated with the merchant to the virtual payment account if the electronic payment medium was not previously associated with the account. Additionally, the electronic payment medium will also attempt to interact with the merchant hosted site to retrieve specific information provided by the merchant regarding special incentives for utilizing the electronic payment medium associated with the merchant for the particular electronic funds transfer.

At block 320, other characteristics of the electronic fund are provided. These characteristics include identifying the items which will be purchased and the costs of the items. This information will be utilized by the electronic fund medium management system to determine if special rewards or other incentives are associated with these items.

At block 330, information provided by the merchant is accessed. This information may be provided directly by the merchant at their facility via an open network accessible by the electronic payment management system directly or via the user device. The information provided may include special deals for the day, coupons, rewards associated with the items being purchased, or other incentives if the virtual payment account includes an electronic payment medium issued by or sponsored by the merchant.

At block 340, information provided by the respective payment providers or issuers are accessed. This information may be provided by a network enabling the electronic payment management system to access remote host sites hosted or affiliated with the respective payment providers. The information provided may include special deals for the day, coupons, rewards associated with the items being purchased, or other incentives if the virtual payment account utilizes the electronic payment medium issued or sponsored by the respective payment provider or issuer.

At block 350, information provided by third party websites may be accessed. This may include a site hosted by or affiliated with the manufacturer of the items or service being purchased. The third party website may include a special organization which will receive a cash donation if a particular electronic payment medium is utilized.

Figure 5:
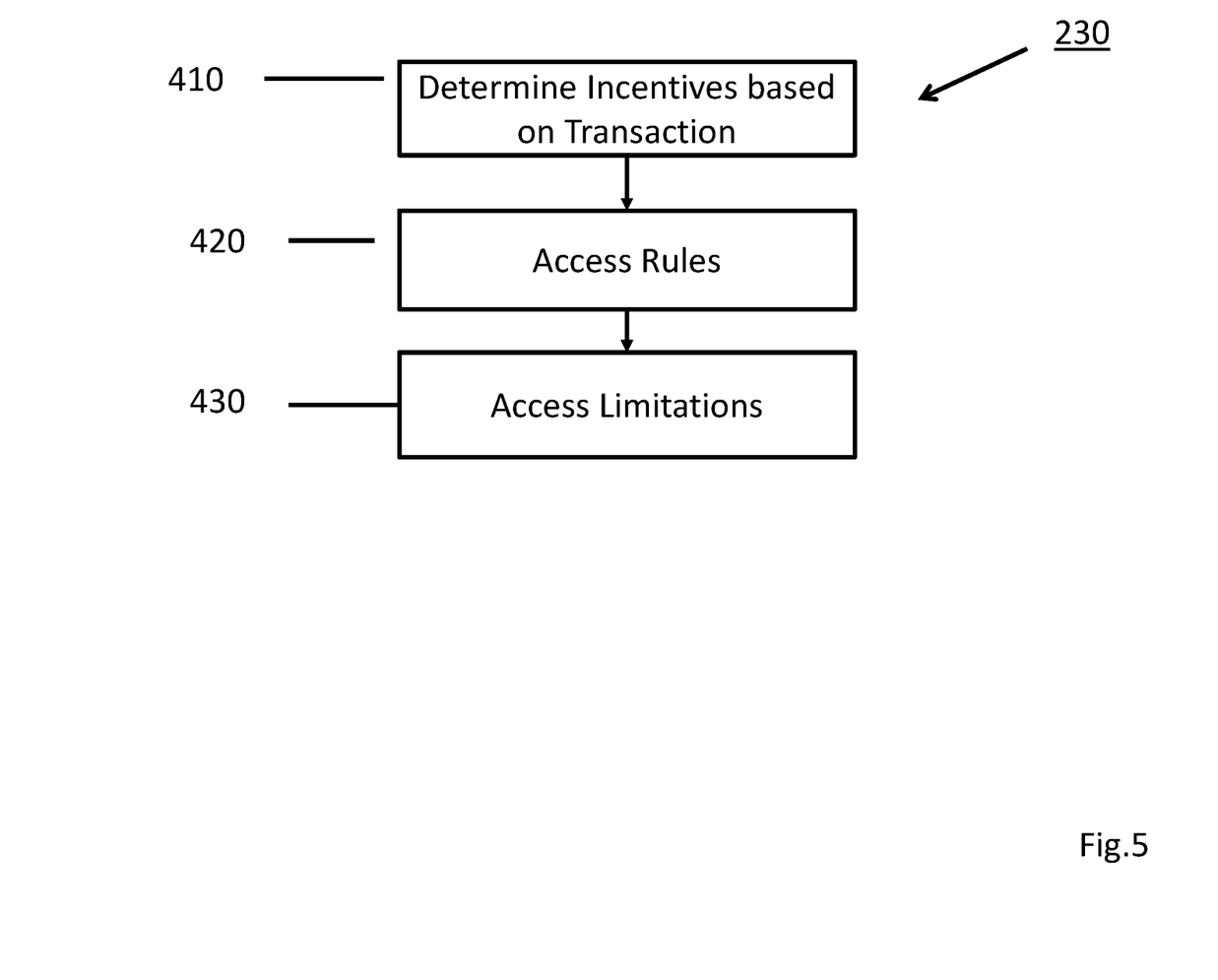
FIG. 5 illustrates a flow chart for identifying payment options for utilization in a virtual payment system according to one or more embodiments.

FIG. 5 illustrates steps associated with block 230 identifying payment options. Block 410 identifies the utilization of information relating to the transaction and utilization of the information from the merchant, payment providers, and third party web sites to determine which incentives are provided by these entities to entice the user to select a particular electronic payment medium for utilization in the electronic funds transfer. For instance, the merchant may provide a ten percent discount if the electronic payment medium associated with a card issued by the merchant is utilized. Another card issuer may offer a separate incentive such as interest-free payments or ninety days, while an additional card issuer of an electronic payment medium associated with the respective virtual payment account may offer a discount if a different brand of item was purchased. Additional incentives or rewards may be provided.

FIG. 5 illustrates at block 420 rules associated with the virtual payment account are accessed. These rules may limit purchase amount of a transaction relating to a particular electronic payment medium, the maximum limit which a particular electronic payment medium may extend credit, the maximum limit of a debit card transaction, the maximum amount which a particular item of the electronic funds transfer may cost, and the type of item being purchased. For instance, virtual payment account 150 may be associated with an adult while virtual payment account 155 is associated with a child. Virtual payment account 150 may be utilized for the purchase of alcohol or tobacco products, while virtual payment account 155 may not. Other rules may include, item limits, allowed merchants, excluded merchants, the location of the transaction, the time range for the transaction, maximization of reward incentives provided by the respective card issuers, maximization of cash back rewards provided by the respective card issuers, and maximization of benefits from coupons.

FIG. 5 illustrates at block 430 that respective limitations of the respective electronic payment mediums are considered. For instance, while as shown in FIG. 1, electronic payment medium 172 is associated with both virtual accounts 150 and 155, since virtual account 150 is associated with a child, the spending limits for electronic payment medium 172 may be less for virtual payment account 155 than 150 associated with the adult. Other limits may include spending limits and account limits. The differentiation of limitations and rules is for illustrative purposes and limitations and d rules may be considered the same entity associated with restricting and limiting an electronic payment medium being utilized for respective electronic funds transfer.

In operation, the virtual payment account interacts and manages the utilization of a respective electronic payment medium for a particular electronic funds transfer. The virtual payment account assembles a plurality of distinctive electronic payment mediums having different benefits, terms and conditions associated with them. An electronic payment management system receives information related to a particular transaction and simultaneously accesses networked sites affiliated with issuers of the respective electronic payment medium to determine if incentives are available which will influence the consumer in selecting the appropriate electronic payment medium. The electronic payment management system integrates the information from the transaction with the offerings from the respective issuers of the respective electronic payment medium to evaluate and select the electronic payment medium offering the best incentives. The selected electronic payment medium is recommended to the consumer for utilization in the electronic funds transfer. The provision of real-time information from an external source relating to current deals associated with the electronic funds transfer provides the consumer with beneficial knowledge which may possibly influence the consumer in the decision on which electronic payment medium to utilize.

Figure 6:
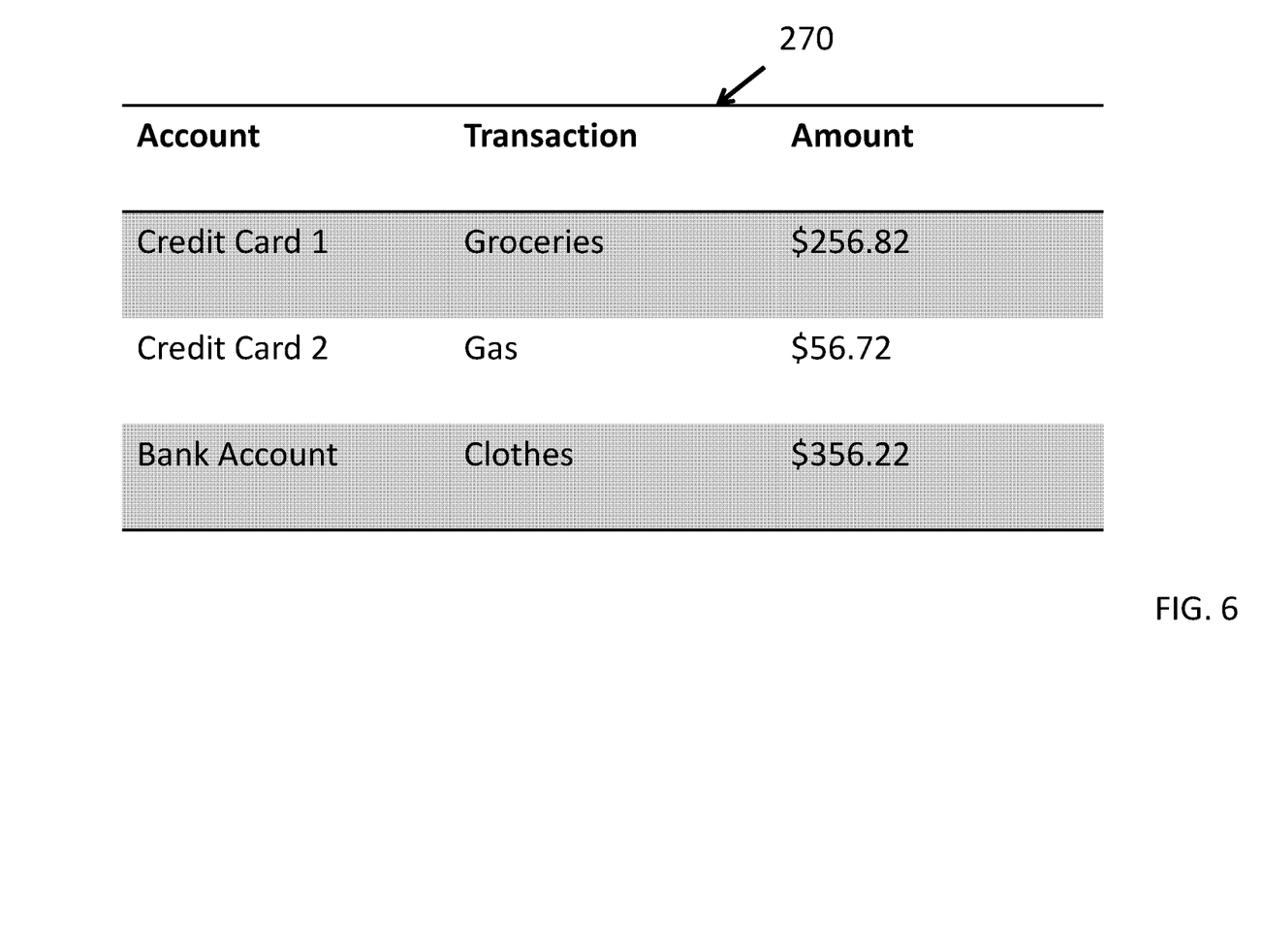
FIG. 6 illustrates a database for recording transactions conducted utilizing a virtual payment system.

Also, various virtual payment accounts may be established utilizing different subsets of available electronic payment mediums for multiple users or purposes. Rules may be placed for different users limiting utilization of the respective electronic payment medium. Also, accounts may be created for limited and special purposes such as a trip, or special event shopping such as a wedding, or going back to school with each virtual payment account having specialized rules for the respective time or event. Instance As shown in FIG. 6, report 270 includes transactional information relating to a respective virtual payment account. The report may include which account was utilized for a particular transaction, the items involved and the amount involved. This record keeping is separate and apart from the individual reporting done by the individual issuers of the respective electronic payment medium and provides an aggregate view of the financial purchases made by the consumer which may be utilized for budget purposes. Also, the consumer may review the transactions to establish if the rules in place appear sufficient or if one particular electronic payment medium is consistently being chosen. Additionally, a review of the respective transactions may indicate which accounts provide the better incentives and possibly determine that certain payment devices are never utilized and such accounts should possibly be closed.

Figure 7:
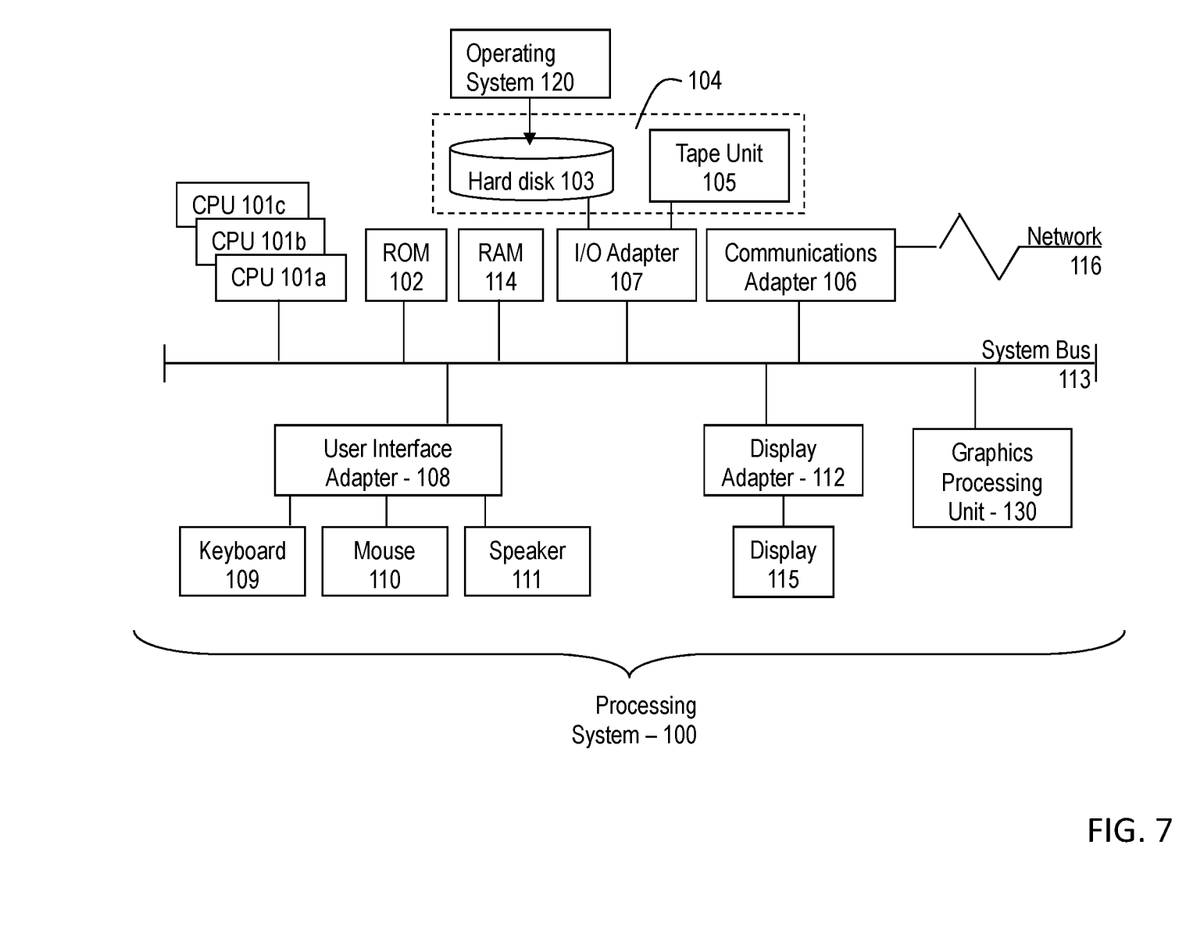
FIG. 7 shows a computer system according to an embodiment.

Referring to FIG. 7, there is shown electronic payment management system 100 according to one or more embodiments. First computing device 160 may have the same configuration as electronic payment management system 100. The electronic payment management system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 7 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 7, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing electronic funds transfer, the method comprising:
    obtaining, using a processor system of a mobile apparatus of a user, a virtual payment account having access to a plurality of electronic payment mediums capable of being utilized in an electronic funds transfer, wherein each electronic payment medium is associated with at least one issuer providing consumer credit funding on behalf of the user, wherein the mobile apparatus includes a display an input, a memory, a global positioning system (GPS) configured to generate information related to a current location of the mobile apparatus and the processor, and at least one application computer program installed on the mobile apparatus for querying the user via the display to provide detailed information of the electronic funds transfer via the input for transmission to the virtual payment account host site wherein the detailed information is selected from a group comprising: price of items subject to the electronic funds transfer, type of items subject to the electronic funds transfer, manufacturer of items subject to the electronic funds transfer;
    determining, using the GPS system of the mobile apparatus, a location and identity of a merchant via communication by the mobile apparatus with an electronic terminal of the merchant, wherein the determining comprises determining the location of a specific electronic funds transfer relating to the merchant;
    adding, based on the determining, a merchant issued card issued by the merchant to the virtual payment account based on detecting that the merchant issued card was not previously associated with the virtual payment account, wherein the merchant issued card comprises an additional one of the plurality of electronic payment mediums;
    obtaining, using an electronic payment management system, detailed information related to the electronic funds transfer, wherein the electronic payment management system is in real-time communication with the virtual payment account and the plurality of electronic payment mediums, wherein the information comprises at least the items subject to the electronic funds transfer;
    providing, by the electronic payment management system and based on the items subject to the electronic funds transfer, merchant-based incentives available from the merchant to the user via the display on the mobile apparatus;

communicating, by the electronic payment management system, the items subject to the electronic funds transfer to a manufacturer of the items;

receiving, by the electronic payment management system, from a host site of a manufacturer of the items that are the subject of the electronic funds transfer, any manufacturer-based incentives for purchasing the manufacturer-specific items that are the subject of the electronic funds transfer, wherein the manufacturer-based incentives are in addition to the merchant-based incentives;

comparing, by the electronic payment management system, the detailed information relating to the electronic funds transfer using the merchant-based card with the detailed information relating to the electronic funds transfer using one or more of the plurality of electronic payment mediums;

determining, by the electronic payment management system, based on the detailed information related to the electronic funds transfer, a selected electronic payment medium from the plurality of electronic payment mediums for being a source of electronic funds for the electronic funds transfer; and recommending, via the display, the selected electronic payment medium to the user for presentation to the electronic terminal for engaging in the electronic funds transfer with the merchant at the time of transfer.

2. The computer-implemented method of claim 1, further including tendering payment via the mobile apparatus utilizing the selected electronic payment medium via near field communication technology or contactless technology.

3. The computer-implemented method of claim 1, wherein the memory of the mobile apparatus stores at least one application computer program configured for controlling the processor for initiating the electronic funds transfer utilizing the virtual payment account.

4. The computer-implemented method of claim 3, wherein the mobile apparatus includes a display and an input, the application computer program querying a user via the display to provide details of the electronic funds transfer via the input for transmission to the electronic payment management system for determining the selected electronic payment medium, wherein the details are selected from a group comprising: price of items subject to the electronic funds transfer, type of items subject to the electronic funds transfer, manufacturer of items subject to the electronic funds transfer; and an identity of a merchant receiving the electronic funds, subject to the electronic funds transfer.

5. The computer-implemented method of claim 1, wherein the electronic payment mediums are selected from a group comprising: merchant issued cards, bank institution issued cards, credit card processing system issued card; banking debit cards; and gift cards.

6. The computer-implemented method of claim 1, wherein the electronic payment management system is in electronic communication with a remote site for accessing incentive information from a remote site relating to the electronic funds transfer, the remote site selected from a group comprising: a remote site hosted by a merchant providing information relating to incentives associated with utilizing a merchant issued card as a source of funds for the electronic funds transfer; a remote site hosted by a banking institution providing information relating to incentives associated with utilizing a bank institution issued card; a remote site hosted by a credit card processing system providing information relating to incentives associated with utilizing a credit card processing system issued card; and third party site hosted by a third party providing information relating to incentives associated with the electronic funds transfer.

7. The computer-implemented method of claim 6, wherein the electronic payment management system utilizes the incentive information for determining which electronic funds transfer medium to recommend for utilization in the electronic funds transfer.

8. The computer-implemented method of claim 1, wherein the electronic payment management system evaluates rules associated with the virtual payment account relating to the electronic funds transfer mediums prior to recommending one of the plurality of electronic funds transfer mediums.

9. The computer-implemented method of claim 8, wherein the rules associated with the virtual payment account relating to the electronic funds transfer mediums are selected from a group comprising: spending limits, account limits, items which may be purchased; allowed merchants; excluded merchants; location of purchase; time range of purchase; maximization of reward points; maximization of cash back rewards; and maximization of benefits from coupons.

10. The computer-implemented method of claim 1, further including recording details of a plurality of electronic funds transfers utilizing a virtual payment account in a log.

11. A system for an electronic funds transfer involving a purchase, the system comprising:

an input device associated with a user mobile apparatus of a user for inputting information relating to the purchase associated with the electronic funds transfer, wherein each electronic payment medium is associated with at least one issuer providing consumer credit funding on behalf of the user, wherein the mobile apparatus includes a display an input, a memory, a global positioning system (GPS) configured to generate information related to a current location of the mobile apparatus and the processor, and at least one application computer program installed on the mobile apparatus for querying the user via the display to provide detailed information of the electronic funds transfer via the input for transmission to a virtual payment account host site wherein the detailed information is selected from a group comprising: price of items subject to the electronic funds transfer, type of items subject to the electronic funds transfer, manufacturer of items subject to the electronic funds transfer; and an electronic payment management system having a processor system accessing a virtual payment account including a plurality of electronic payment mediums issued by a plurality of distinctive issuers;

the processor system determining, using the GPS system of the mobile apparatus, a location and identity of a merchant via communication by the mobile apparatus with an electronic terminal of the merchant, wherein the determining comprises determining the location of a specific electronic funds transfer relating to the merchant;

the processor system adding, based on the determining, a merchant issued card issued by the merchant to the virtual payment account based on detecting that the merchant issued card was not previously associated with the virtual payment account, wherein the merchant issued card comprises an additional one of the plurality of electronic payment mediums;

the processor system providing, by the electronic payment management system and based on the items subject to the electronic funds transfer; merchant-based incentives available from the merchant to the user via the display on the mobile apparatus;

the processor system communicating, by the electronic payment management system, the items subject to the electronic funds transfer to a manufacturer of the items;

the processor system receiving, by the electronic payment management system, from a host site of a manufacturer of the items that are the subject of the electronic funds transfer, any manufacturer-based incentives for purchasing the manufacturer-specific items that are the subject of the electronic funds transfer, wherein the manufacturer-based incentives are in addition to the merchant-based incentives;

the processor system receiving the detailed information relating to the purchase associated with the electronic funds transfer and capable of accessing incentive information from remote sites associated with the distinctive issuers of the respective electronic payment mediums relating to the purchase associated with the electronic funds transfer;

the processor system comparing, by the electronic payment management system, the detailed information relating to the electronic funds transfer using the merchant-based card with the detailed information relating to the electronic funds transfer using one or more of the plurality of electronic payment mediums; and the processor system providing a recommendation to the user mobile apparatus on selection of a respective electronic payment medium from the plurality of electronic payment mediums associated with the virtual payment account based on the information relating to the purchase associated with the electronic funds transfer and incentive information associated with the distinctive issuers of the respective electronic payment mediums relating to the purchase associated with the electronic funds transfer.

12. The system of claim 11 including a user mobile apparatus having a user mobile apparatus processor and a user mobile apparatus memory in electrical communication with the user mobile apparatus processor and at least one application computer program stored in the user mobile apparatus memory configured for controlling the user mobile apparatus processor for conducting an electronic funds transfer and transferring information relating to the purchase associated with the electronic funds transfer to the electronic payment management system for inclusion in determining the selection of the electronic payment medium.

13. The system of claim 12, wherein the user mobile apparatus is a mobile smart phone which includes a display, the application computer program querying a user via the display to associate a name for the purchase which is associated with the electronic funds transfer.

14. The system of claim 11, including at least one remote site providing incentive information associated with at least one issuer of a respective electronic payment medium of the virtual payment account, the incentive information relating to the purchase associated with the electronic funds transfer.

15. A computer program product for an electronic funds transfer, the computer program product comprising a computer readable storage medium having program instructions embodied therewith, wherein the computer readable storage medium is not a transitory signal per se, the program instructions readable by a processing circuit to cause the processing circuit to perform a method comprising:

obtaining, using a processor system of a mobile apparatus of a user, a virtual payment account having access to a plurality of electronic payment mediums capable of being utilized in an electronic funds transfer, wherein each electronic payment medium is associated with at least one issuer providing consumer credit funding on behalf of the user, wherein the mobile apparatus includes a display an input, a memory, a global positioning system (GPS) configured to generate information related to a current location of the mobile apparatus and the processor, and at least one application computer program installed on the mobile apparatus for querying the user via the display to provide detailed information of the electronic funds transfer via the input for transmission to a virtual payment account host site wherein the detailed information is are selected from a group comprising: price of items subject to the electronic funds transfer, type of items subject to the electronic funds transfer, manufacturer of items subject to the electronic funds transfer;

determining, using the GPS system of the mobile apparatus, a location and identity of a merchant via communication by the mobile apparatus with an electronic terminal of the merchant, wherein the determining comprises determining the location of a specific electronic funds transfer relating to the merchant;

adding, based on the determining, using the processor system, a merchant issued card issued by the merchant to the virtual payment account based on detecting that the merchant issued card was not previously associated with the virtual payment account, wherein the merchant issued card comprises an additional one of the plurality of electronic payment mediums;

obtaining, using an electronic payment management system, detailed information related to the electronic funds transfer, wherein the electronic payment management system is in real-time communication with the virtual payment account and the plurality of electronic payment mediums, wherein the information comprises at least the items subject to the electronic funds transfer;

providing, by the electronic payment management system and based on the items subject to the electronic funds transfer, merchant-based incentives available from the merchant to the user via the display on the mobile apparatus;

communicating, by the electronic payment management system, the items subject to the electronic funds transfer to a manufacturer of the items;

receiving, by the electronic payment management system, from a host site of a manufacturer of the items that are the subject of the electronic funds transfer, any manufacturer-based incentives for purchasing the manufacturer-specific items that are the subject of the electronic funds transfer, wherein the manufacturer-based incentives are in addition to the merchant-based incentives;

comparing, by the electronic payment management system, the detailed information relating to the electronic funds transfer using the merchant-based card with the detailed information relating to the electronic funds transfer using one or more of the plurality of electronic payment mediums;

determining by the electronic payment management system, based on the detailed information related to the electronic fund, a selected electronic payment medium from the plurality of electronic payment mediums for being a source of electronic funds for the electronic funds transfer; and recommending, via the display, the selected electronic payment medium to the user for presentation to the electronic terminal for engaging in the electronic funds transfer with the merchant at the time of transfer.

16. The computer program product of claim 15, wherein the mobile apparatus comprises a processor and a memory in data communication with the processor, wherein the memory stores at least one application computer program configured for controlling the processor for providing information related to the electronic funds transfer to the electronic payment management system.

17. The computer program product of claim 16, wherein the mobile apparatus includes a display and an input, the application computer program querying a user via the display to provide details of the electronic funds transfer via the input for transmission to the electronic payment management system for determining the selected electronic payment medium, wherein the details are selected from a group comprising: price of items subject to the electronic funds transfer, type of items subject to the electronic funds transfer, manufacturer of items subject to the electronic funds transfer; and an identity of merchant receiving the electronic funds, subject to the electronic funds transfer.

18. The computer program product of claim 15, wherein the electronic payment mediums are selected from a group comprising: merchant issued cards, bank institution issued cards, credit card processing system issued card; banking debit cards; and gift cards.

19. The computer program product of claim 15, wherein the electronic payment management system is in electronic communication with a remote site for accessing incentive information from a remote site relating to the electronic funds transfer, the remote site selected from a group comprising: a remote site hosted by a merchant providing information relating to incentives associated with utilizing a merchant issued card as a source of funds for the electronic funds transfer; a remote site hosted by a banking institution providing information relating to incentives associated with utilizing a bank institution issued card; a remote site hosted by a credit card processing system providing information relating to incentives associated with utilizing a credit card processing system issued card; and third party site hosted by a third party providing information relating to incentives associated with the electronic funds transfer.

\* \* \* \* \*